Patented July 8, 1952

2,602,812

UNITED STATES PATENT OFFICE 2,602,812

PROCESS OF OXIDIZING PARAFFINIC HYDROCARBONS

Wilhelm Gottschall, Oberhausen-Sterkrade, Helmut Kolling, Duisburg-Hamborn, and August Hagemann, Duisburg-Meiderich, Germany, assignors to Ruhrchemie Aktiengesellschaft, Oberhausen-Holton, Germany, a joint-stock company of Germany No Drawing. Application August 8, 1949, Serial No. 109,238. In France August 13, 1948

15 Claims. (Cl. 260—451)

This invention relates to improvements in the known process of oxidation of paraffinic hydrocarbons in which the hydrocarbons are oxidized by the simultaneous action of concentrated sulfuric acid and nitrous fumes, i. e. gases containing oxygen compounds of nitrogen and quite especially nitrogen dioxide for instance the gases produced in the combustion of ammonia as oxidants. In this process these gases act on the hydrocarbons in the presence of the concentrated sulfuric acid, for instance an acid containing 96% $H_2SO_4$, or concentrated sulfuric acid containing nitrous fumes may be used. This process offers the advantage that, besides monocarboxylic acids, only a very low percentage of nitrogen-containing compounds are formed.

When a diesel oil fraction from the catalytic hydrogenation of carbon monoxide, boiling within the range of 250° C. and 320° C. and containing hydrocarbons with 14 to 18 carbon atoms in the molecule, is oxidized by means of a gas mixture containing about 10% $NO_2$ such as is formed in the catalytic combustion of ammonia, there are formed products of reaction having an acid number of about 50 and an ester number of about 100, provided 1000 liters of nitrous fumes are used per kilogram diesel oil per hour in the reaction proceeding at 120° C. and the reaction is continued for 12 hours. If, however, under similar conditions of reaction, also 500 ccms. of a sulfuric acid of 96%, previously charged with nitrous gases, are added to the mixture about to react, the products of reaction, while having also an acid number of 50, show only an ester number of 5. The poor oxidation effect which is illustrated by the low acid number, forms a great drawback in this method of paraffin oxidation.

We have now found that the oxidation effect is considerably increased, if, instead of such highly concentrated sulfuric acid, a sulfuric acid containing nitrous fumes, but less than 90% $H_2SO_4$, and preferably containing $H_2SO_4$ within the range of about 69% and 90% is used. Particularly good results are obtained with an acid containing 80–90% $H_2SO_4$. In the process according to this invention, in spite of the great rise of the acid number, i. e. in spite of very much stronger oxidation, the ester number remains far below the numbers obtained when operating in the absence of such sulfuric acid.

We have found that on reacting the diesel oil fraction mentioned above with a gas mixture containing 10% $NO_2$ and passing during 12 hours 10 liters of this gas mixture per kilogram of diesel oil through the reaction zone at a temperature of 120° C. the following results are obtained:

*Sulfuric acid containing nitrous fumes*

| Spec. Grav. (D 20) | $H_2SO_4$, Per cent by weight | Acid number | Ester number |
|---|---|---|---|
| 1.9 | 96 | 50 | 5 |
| 1.8 | 85 | 100 | 20 |
| 1.7 | 76 | 135 | 35 |
| 1.6 | 69 | 150 | 60 |
| 1.5 | 60 | 140 | 90 |
| 1.4 | 50 | 120 | 120 |

These figures show that a sulfuric acid of 85% produces double the amount of fatty acid hitherto obtained with a sulfuric acid of 96% containing nitrous fumes. Maximum oxidation with an acid number of 150 is attained with a sulfuric acid containing about 69% $H_2SO_4$. When operating with a less concentrated acid, the acid number drops and so does the ester number which at the maximum of fatty acid formation, i. e. at an acid concentration of 69%, becomes 60. Although under these conditions the oxidation effect is about three times as strong as when operating without an addition of sulfuric acid, the ester number is only half as high. With sulfuric acid containing less than 69% $H_2SO_4$ the ester number, in contrast to the acid number, rises. It is therefore not advisable to operate with a sulfuric acid containing less than 69% $H_2SO_4$.

The ester number of the products of reaction is mainly due to the presence of nitroparaffins which consume KOH. Thus, when oxidizing with sulfuric acid of a concentration according to the present invention containing nitrous fumes, there are formed as the table shows, considerable amounts of nitroparaffins as by-products. However this is irrelevant, because, when the reaction mixture is saponified with alkali carbonates, for instance with a soda solution, the nitroparaffin can readily be separated together with the hydrocarbons not affected in the reaction. There takes place a separation of layers, the hydrocarbons and the nitroparaffins rising in the soda solution. The fatty acid mixture which can be recovered from the soda solution by adding mineral acids, practically has no ester number. In a renewed oxidation of the separated hydrocarbons containing nitroparaffins, the concentration of the sulfuric acid containing nitrous compounds plays a decisive role. When a more dilute sulfuric acid containing nitrogen oxides is used, the ester number as a rule rises further.

However, when using a sulfuric acid containing nitrogen compounds which contains 80–90% $H_2SO_4$, the ester number, contrary to expectations, does not rise during further oxidation of the separated mixture of hydrocarbons and nitroparaffins. If acid concentrations of the kind mentioned hereabove are circulated in contact with the not oxidized fraction, the yield is not lowered by a further formation of nitro compounds.

The mixture containing hydrocarbons and nitroparaffins which remains over after treatment with soda solution is preferably returned into the cyclic process together with a corresponding quantity of fresh hydrocarbons admixed to it. The amount of fresh hydrocarbons to be added depends on the amount of fatty acids formed by oxidation. By using sulfuric acids containing nitric fumes and having a concentration within the range of 80 and 90% $H_2SO_4$, acid numbers can be obtained which are about double as high as those obtainable with highly concentrated acids containing nitrous compounds, without any nitroparaffins being formed as by-products. The hydrocarbons which had not reacted in the first operation are once more acted upon.

Since in the oxidation of hydrocarbons water is formed, as a by-product special care must be taken to keep the concentration of the sulfuric acid constant during the reaction period. To this end the water can constantly be removed partly or altogether in a well known manner outside of the zone of reaction from the recycled gases. One can however also lower the percentage of moisture in the gases or the extent of gases treated. However also by correspondingly varying the quantity of acid added its concentration can be kept constant by increasing the quantity of acid present in the reaction zone in proportion as the percentage of water rises.

If the concentration of the sulfuric acid containing nitrous fumes is maintained during the oxidation, the acid can be reused again and again. In that case no pretreatment of the used acid with nitrous fumes is required because the percentage of $NO_2$ in the used acid merely depends from the acid concentration of the acid and, if fresh sulfuric acid is used, will adjust itself, shortly after the reaction has been started, to the corresponding final value. In view of the comparatively large quantities of sulfuric acid required for an oxidation of paraffin according to this invention, it is a great advantage to be able to constantly reuse the sulfuric acid containing the nitrous products in the cyclic process.

The way above described of carrying out the oxidation of paraffin according to the invention involves the drawback that the small quantities of nitrous oxide ($N_2O$) and nitrogen (N) which are formed in by-reactions will accumulate in the circulating gas and will dilute it. In order, therefore, to maintain the minimum concentration of $NO_2$ which is required for the oxidation of paraffin, a certain percentage of the circulating gas must constantly be withdrawn from circulation and replaced by fresh gas. This results in a rather considerable consumption of $NO_2$ which gets lost in the less valuable residual gases rich in nitrogen. For the residual gases are also soiled by organic constituents formed in the reaction and would be fit to be reused only after having been purified in a rather circumstantial process. These drawbacks can be avoided if the paraffinic hydrocarbons are oxidized with sulfuric acid containing nitrous fumes without also adding nitrous gases, for then the paraffins can be converted into fatty acids without a lowering of the total yield. Since the oxidation requires large quantities of sulfuric acid containing nitrous fumes, the sulfuric acid is circulated between the paraffin oxidation vat and an apparatus by means of which the percentage of nitrous fumes in the sulfuric acid can be increased again.

Also when merely using sulfuric acid containing nitrous fumes, it is possible to influence in a certain degree the extent of oxidation and the formation of nitroparaffins by means of the concentration of the sulfuric acid used. The best results can be obtained with a sulfuric acid containing 80 to 85% $H_2SO_4$ and nitrous fumes.

In the operation of this form of oxidation of paraffin according to this invention a quantity of sulfuric acid containing nitrous fumes is continuously introduced into a reaction vessel filled with liquid or molten paraffinic hydrocarbons which is sufficient to provide the quantity of $NO_2$ required for oxidation. During the oxidation process part of the $NO_2$ dissolved in the sulfuric acid is reduced and escapes from the sulfuric acid in the form of NO. Therefore, the acid flowing from the reaction vessel contains less nitrous fumes than the acid entering it. In order to increase its concentration of nitrous fumes, it is introduced into the top of a column into which are introduced nitrous fumes from below. In this manner the original $NO_2$ concentration of the sulfuric acid is restored and it can now be reintroduced into the paraffin which shall be oxidized. Nitrous fumes of different origin can be used for absorption by this sulfuric acid. It is possible to use fumes containing a percentage of $NO_2$ lower than was hitherto thought fit for use in the oxidation of paraffin. The nitrous fumes escaping from the reaction vessel are also introduced into the sulfuric acid in the column so that no purely mechanical losses of nitrous compounds can be avoided.

The water formed in the reaction can be removed by heating the acid which runs off, which can then be charged again with nitrous gases. However, it is much simpler to introduce into the paraffin oxidation vessel so much dry gas that the water which forms, can escape completely with the gas. Inert gases as well as gases containing oxygen, for instance air, are adapted for use in removing the water. The gas which escapes from the reaction vessel is freed by cooling from the water it has absorbed. The gases used in the removal of water may subsequently also be passed through the sulfuric acid column.

The gases serving for the removal of water may be conducted in a cycle because during the reaction the gas also extracts from the sulfuric acid small quantities of nitrous compounds.

If the gas serving for the removal of water were not conducted in a cycle, all of it would have to be introduced in its totality into the column in which the sulfuric acid is recharged with nitrous gases. By circulating the gases which carry away the water, only that percentage of the gas must be passed through the sulfuric acid column which corresponds to the quantities of nitrous gases escaping from the acid. In this case the gases introduced into the sulfuric acid column must contain so much oxygen that the NO formed in the reaction can be oxidized again to form $NO_2$.

That form of the process according to the invention which is carried out only with sulfuric acid containing nitrous fumes, offers the advantage that the paraffin oxidation is possible also with gases containing a very low percentage of $NO_2$. The quantities of $N_2O$ and $N_2$ which have formed during the reaction, can be removed from the gases escaping from the reaction vessel which turn over their nitrous fumes to the sulfuric acid, without losing any $NO_2$. From the top of the sulfuric acid column there escapes a waste gas which practically consists only of $N_2$ and $N_2O$ and is valueless as far as the oxidation process is concerned. Only so much fresh nitrous gas must continuously be introduced into the process is lost by reduction to nitrogen or nitrous oxide.

In the operation of the process according to our invention, we may proceed for instance as follows:

Example 1

The fact that, in the process of paraffin oxidation according to this invention, no unlimited increase of the ester number occurs, can be proved as follows:

An oxidation product produced by treating a hydrogenated diesel oil fraction from the catalytic carbon monoxide hydrogenation boiling within the range of 250 and 300 deg. C. and which contained the hydrocarbons containing from 14 to 18 C atoms, with nitrous gases in the presence of sulfuric acid containing nitrous fumes, this oxidation product having an acid number of 105 and an ester number of 24, was saponified with dilute soda solution. Above the aqueous phase settled a mixture of the nonaffected hydrocarbons and the nitrogen containing compounds which had formed. To 1000 grams of this mixture which had an acid number of 2 and an ester number of 37, there were added in a flask 500 ccms. of a 85% sulfuric acid, which, after having absorbed about 10% $NO_2$, had a specific gravity of 1.80. The mixture was heated to 120 deg. C. and under constant stirring 1000 liters of a mixture of nitrous gases and air were passed through it per hour, which mixture was saturated with water vapor at 20 deg. C. and contained 10% $NO_2$ by volume. The water expelled with the exhausted gases was condensed in a cooler connected in series and was withdrawn, while the organic constituents which had been carried along and were condensed also, were returned into the reaction vessel. After 12 hours' treatment the reaction was interrupted and the product of oxidation was washed with hot water. There resulted 840 grams of a slightly yellow colored liquid reaction product with an acid number of 103 and an ester number of 36. Thus, as compared with the hydrocarbon mixture started from, the ester number had practically remained the same.

When 1000 grams of the hydrocarbon mixture used in the above example were oxidized under the same conditions, however using a sulfuric acid containing 73% $H_2SO_4$ and charged with about 10% by weight of $NO_2$, there resulted 830 grams of a yellow colored liquid oxidation product having an acid number of 142 and an ester number of 73. Thus, in this case, the ester number rose materially.

Example 2

In a glass flask provided with a discharge faucet at the bottom, 1000 grams of a hard paraffin of the mean molecular weight 496 produced by the catalytic hydrogenation of carbon monoxide was heated to 120 to 125 deg. C. under stirring. Through a dropping funnel 700 ccms. of a sulfuric acid containing nitrous fumes and 83% $H_2SO_4$ were introduced per hour, while the same quantity of acid was continuously released at the flask bottom. Through the liquid reaction mixture was blown 600 liters of air per hour. The gas escaping from the glass flask and containing also the NO liberated from the sulfuric acid and the $N_2$ and $N_2O$ formed in the oxidation, was now passed from below in countercurrent to the sulfuric acid escaping from the reaction vessel through a column, escaping from the head of this column a gas free from $NO_2$ and NO. Apart from this, also 150 liters of a gas mixture containing 15% $NO_2$ had to be introduced into the column to replace the quantities of $NO_2$ and $N_2$ formed from the $NO_2$. Thus 22.5 liters $NO_2$ were consumed per hour.

After a reaction period of 10 hours the oxidation was interrupted and the reaction mixture was freed from sulfuric acid by washing with hot water. The product obtained had the neutralization number 79 and the saponification number 89. The sulfuric acid was adapted for use in further reactions.

We wish it to be understood that various changes can be made in the performance hereabove described of the process according to our invention and in the proportions of the reagents used in the examples without departing from the invention or sacrificing the advantages thereof.

We claim:

1. In the process of simultaneously reacting paraffinic hydrocarbons with concentrated sulfuric acid and nitrogen dioxide as oxidants, the step of using sulfuric acid containing $H_2SO_4$ within the range of about 70 and 90 percent.

2. In the process of claim 1 the step of substantially maintaining the concentration of the sulfuric acid used at its original level.

3. In the process of claim 1 the step of reducing the percentage of moisture of the nitrous gases before they enter the reaction zone in order to substantially maintain the concentration of the sulfuric acid at its original level.

4. In the process of claim 1 the steps of circulating the gases to be reacted through the reaction zone and removing water from said gases when they have left said zone.

5. In the process of claim 1 the step of raising the percentage of $NO_2$ containing gas introduced into the reaction zone in proportion to the increase of water formed in the reaction.

6. In the process of claim 1 the step of raising the quantity of sulfuric acid, which is introduced into the reaction zone, in proportion to the increase of water formed in the reaction.

7. In the process of claim 1 the steps of treating the mixture of products resulting from the reaction between the paraffin hydrocarbons and the concentrated sulfuric acid containing nitrogen dioxide with an alkali carbonate to separate out nitroparaffines and unconverted hydrocarbons and oxidizing said nitroparaffines and hydrocarbons with a sulfuric acid containing nitrous fumes and a percentage of $H_2SO_4$ ranging between about 80 and 90 percent.

8. In the process of claim 1 the steps of treating the mixture of products resulting from the reaction with an alkali carbonate to separate out nitroparaffines and unconverted hydrocarbons, admixing to these separated nitroparaffins and unconverted hydrocarbons fresh hydrocarbons and then oxidizing the mixture with a sulfuric acid containing nitrous fumes and a percentage of $H_2SO_4$ ranging between about 80 and 90 percent.

9. In the process of claim 1 the step of using a sulfuric acid with a percentage of $H_2SO_4$ ranging between 80 and 85 percent and containing sufficient nitrogen dioxide to effect a complete oxidation of the paraffinic hydrocarbons under treatment.

10. In the process of claim 1 the step of continuously leading the sulfuric acid which was used in the oxidation reaction, into contact with fresh nitrogen dioxide.

11. In the process of claim 1 the steps of heating the sulfuric acid used in the oxidation to remove the water of reaction and then introducing into said acid fresh nitrous fumes.

12. In the process of claim 1 the step of passing through the reaction zone a quantity of dry gases sufficient to absorb and carry away the water formed in the oxidation reaction.

13. In the process of claim 1 the steps of circulating a quantity of dry gases sufficient to absorb and carry away the water formed in the oxidation reaction through the reaction mixture and then into contact with fresh nitrous fumes.

14. In the process of claim 1, the step of using sulfuric acid which contains about 10 percent nitrogen dioxide.

15. In the process of claim 1, the step of introducing into the reaction zone together with the sulfuric acid a gas mixture containing the nitrogen dioxide.

WILHELM GOTTSCHALL.
HELMUT KOLLING.
AUGUST HAGEMANN.

REFERENCES CITED

The following references are of record in the file of this patent:

UNITED STATES PATENTS

| Number | Name | Date |
|---|---|---|
| 2,009,663 | James | July 30, 1935 |

FOREIGN PATENTS

| Number | Country | Date |
|---|---|---|
| 461,972 | Great Britain | Feb. 26, 1937 |

OTHER REFERENCES

Office of Tech. Service, PB85,771, page 36, abstract from TOM Reel 36, deposited in Library of Congress, April 18, 1946.